United States Patent [19]
O'Neill

[11] Patent Number: 5,397,210
[45] Date of Patent: Mar. 14, 1995

[54] SAFETY BLOCK

[76] Inventor: David O'Neill, 823 Gin Ct., Rapid City, S. Dak. 57701

[21] Appl. No.: 290,351

[22] Filed: Aug. 15, 1994

[51] Int. Cl.$^6$ .............................................. B60P 1/00
[52] U.S. Cl. .................................... 414/546; 221/298; 414/548; 414/746.4; 414/745.4; 410/52
[58] Field of Search ............... 414/539, 546, 547, 548, 414/549, 556, 680, 685, 745.7, 746.4, 910, 911, 745.4, 745.5, 519; 221/298; 410/77, 52, 153, 156

[56] References Cited

U.S. PATENT DOCUMENTS

| | | | |
|---|---|---|---|
| 1,665,439 | 4/1928 | Brown | 410/133 |
| 1,820,950 | 9/1931 | Schulstadt | |
| 2,604,577 | 7/1952 | Strickland, Jr. et al. | 221/298 X |
| 2,670,861 | 3/1954 | Fondriest et al. | 414/548 |
| 2,776,762 | 1/1957 | Schmidgall | 414/548 |
| 2,827,960 | 3/1958 | Keating et al. | 410/153 |
| 3,042,231 | 7/1962 | Cyphert | 414/548 |
| 3,751,112 | 8/1973 | Hagenbuch | 298/23 DF |
| 3,917,343 | 11/1975 | Taylor et al. | 298/23 |
| 4,576,531 | 3/1986 | Cosnet | 410/36 |
| 4,576,541 | 3/1986 | Dunn et al. | 414/545 |
| 4,784,547 | 11/1988 | Prinz et al. | 410/52 |
| 5,105,915 | 4/1992 | Gary | 187/18 |

FOREIGN PATENT DOCUMENTS

| | | | |
|---|---|---|---|
| 121302 | 3/1948 | Sweden | 414/546 |
| 187187 | 10/1922 | United Kingdom | 414/546 |
| 156469 | 1/1963 | U.S.S.R. | 414/746.4 |
| 625953 | 9/1978 | U.S.S.R. | 414/546 |

*Primary Examiner*—Frank E. Werner
*Attorney, Agent, or Firm*—Gene R. Woodle

[57] ABSTRACT

A safety block is disclosed which may be attached to the rearward end of the cargo bed of a pipe truck which has a powered pipe lift. The safety block includes a bar which automatically raises when pipe is being unloaded using the powered pipe lift and forms a barrier which prevents injuries and promotes worker safety by creating a barrier to prevent other pieces of pipe from rolling off of the rear of the cargo platform.

2 Claims, 2 Drawing Sheets 5,397,210

1

SAFETY BLOCK

INTRODUCTION

This invention relates to safety device to prevent accidental unloading of pipe from a delivery vehicle.

Hundreds of times each day throughout this country pipe, most often concrete pipe, is loaded onto large trucks with long, flat cargo beds for delivery to construction sites. These trucks are often equipped with hydraulically operated lifts or elevators attached to the rear of the cargo bed. These lifts usually include two sturdy steel fingers which protrude upward from the rear of the cargo bed a sufficient length to prevent the pipe from rolling off of the rear of the truck. Pipe may be unloaded by rolling a piece of pipe against the fingers and hydraulically lowering the fingers and the pipe to ground level. The fingers are attached to a mount at the rear of the cargo bed so that they pivot at a point below the cargo bed and, thus, move from a vertical or nearly vertical position to a horizontal or nearly horizontal position. During unloading pieces of pipe ride on the fingers and move in an arc from the level of the cargo bed to the level of the ground or other work surface. Pipe is ordinarily loaded onto these trucks by either a forklift or a crane.

Typically such pieces of pipe are very heavy weighing much more than a person can lift and are often loaded onto trucks more than one level high. Due to the pieces of pipe on the higher levels and, often, the angle of the cargo bed, pieces of pipe on such trucks have a tendency to roll off of the cargo bed. This tendency is extremely dangerous as rolling, moving, or falling pipe may strike workers resulting in injury or death. As a consequence various materials, usually wooden blocks, are placed against the bottom of the rearwardmost piece of pipe to prevent rolling. During unloading one piece of pipe is unloaded while the rest of the pipe is blocked to prevent movement.

Accidents occur during pipe unloading. At least one person is known to have died as a result of such an accident. For various reasons the blocking described above is inadequate to prevent pipe unloading accidents. On some occasions the blocking material has slipped or otherwise failed and pipe has rolled causing injuries. On other occasions workers have forgotten to place the blocks during unloading.

The instant invention promotes worker safety and prevents pipe unloading accidents by providing a blocking mechanism which automatically rises into place above the rear of the cargo bed when the fingers of the pipe lift are lowered to unload a piece of pipe.

BRIEF SUMMARY OF THE INVENTION

The instant invention includes a vertical tube which is welded to the side of the lift mount at the rear of a pipe truck cargo bed. The top of this tube is flush with the top of the lift mount and the top surface of the cargo bed. A bar slides vertically up and down within the tube. One end of a cable is attached to the bottom of the bar. The cable passes through a pulley which is affixed to the tube. The other end of the cable is attached to the lift fingers at a point below the level of the pulley.

When the lift fingers are in the vertical or storage position the top of the bar is slightly below the level of the top of the tube. During unloading the movement of the lift fingers pulls the attached end of the cable down and away from the tube. Because of the pulley, this movement causes the bar to rise and slide upward through the tube. Thus, as one piece of pipe rides downward on the fingers and is unloaded, the bar automatically slides upward and blocks the remaining pieces of pipe to prevent them from rolling off the rear of the cargo bed.

A stop is also attached to the lift mount below the bar at a level such that the bar is allowed sufficient movement to perform its blocking function, but such that the bar may not slide downward completely out of the tube.

In the preferred embodiment safety blocks are used in pairs with one affixed to either side of the lift mount.

One objective of the present invention is to prevent injuries and promote worker safety by preventing pipe from accidentally rolling off of a pipe truck cargo bed during the unloading process; another objective of the present invention is to make the operation of the invention automatic and, thus, greatly reduce the likelihood of accidents caused by worker error; another objective of the present invention is to provide a stop such that no element of the present invention may drop from the pipe truck and become a hazard. These and other objects of the invention will be apparent to those skilled in this art from the following derailed description of a preferred embodiment of the invention.

BRIEF DESCRIPTION OF THE DRAWINGS

The invention is further described in connection with the accompanying drawings, in which.

DETAILED DESCRIPTION OF INVENTION

The safety block is an apparatus which prevents accidents and promotes worker safety by preventing pipe from accidentally rolling off of the end of a pipe truck cargo bed during the unloading process. While one piece of pipe is being unloaded the safety block automatically causes a bar to rise above the rear end of the cargo bed and form a barrier which prevents other pieces of pipe from accidentally rolling off the rear end of the cargo bed. With reference to the drawings the preferred embodiment of the safety block is described in detail below.

Figure 1:
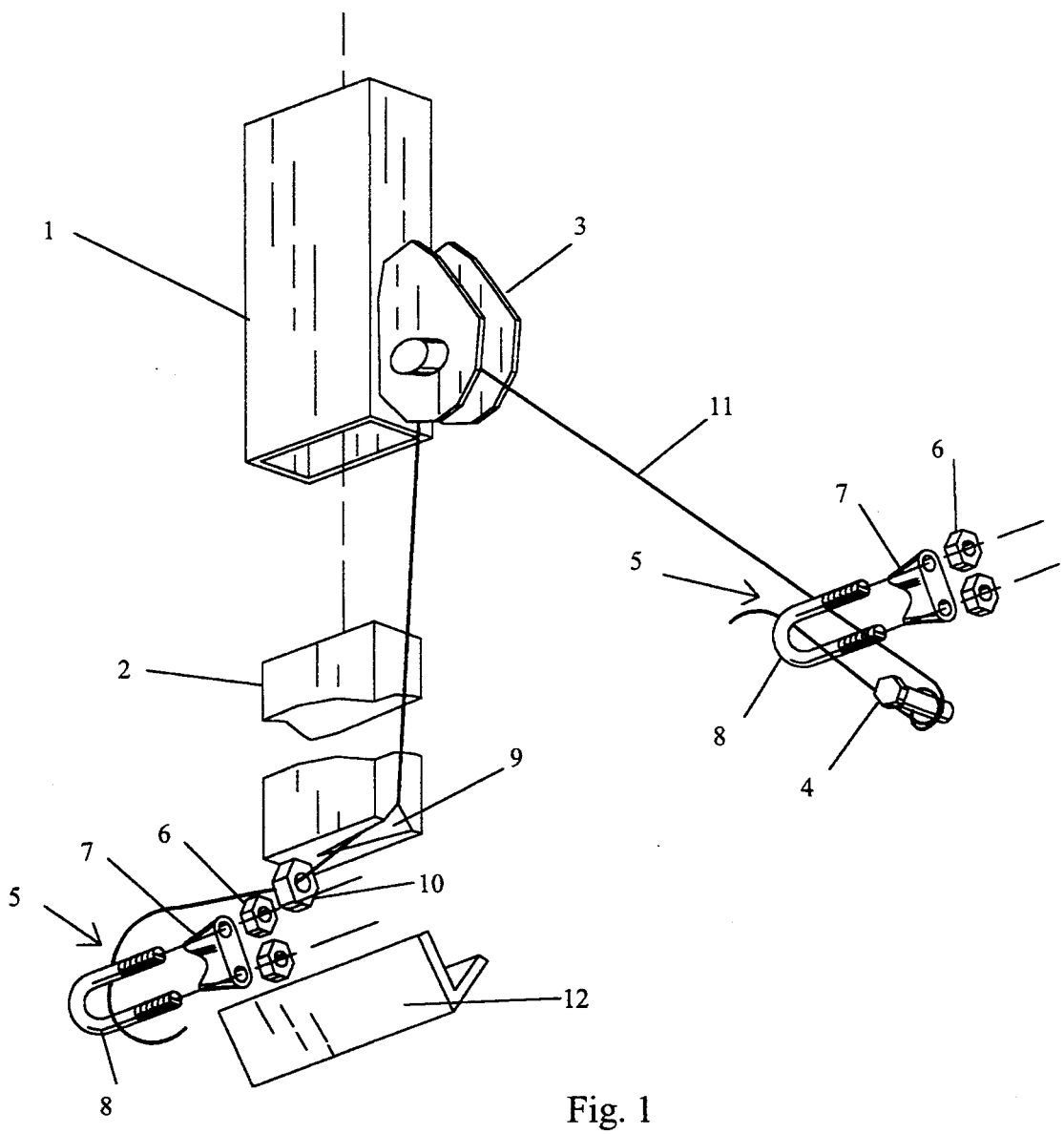
FIG. 1 is an orthographic view of a safety block constructed in accordance with the teachings of the present invention.

The general configuration of the preferred embodiment of the safety block is shown in FIG. 1. The safety block includes a slide tube 1 which is oriented vertically. In the preferred embodiment the slide tube 1 is a rectangular steel tube 8 inches long with cross-sectional outside measurements of 2.5 inches by 1.5 inches and 3/16 inch thick walls, but other materials such as iron and tubes with other shapes and dimensions could be used. The slide tube 1 has a forward face and a rearward face which have the width of the narrower of the two cross-sectional dimensions. A bar 2 slides vertically up and down within the slide tube 1. In the preferred embodiment the bar is rectangular and made of iron and is 24 inches long with cross-sectional measurements of 2 inches by 1 inch, but other materials such as steel could be used. A bar 2 with other shapes and dimensions could also be used provided the shape of the bar 2 is the same as the shape of the slide tube 1, the cross-sectional dimensions of the bar are slightly less than the inside cross-sectional dimensions of the slide tube 1, and the bar 2 slides freely, but smoothly within the slide tube 1. The bar 2 has a forward face and a rearward face which have the width of the narrower of the two cross-sectional dimensions. A pulley 3 is affixed to the slide tube 1 near the bottom of the rearward face of the slide tube 1. In the preferred embodiment a conventional 2 inch pulley is used and the pulley 3 is welded to the slide tube 1, but other sizes or types of pulley could be used and other methods of attachment could be used. In the preferred embodiment the center of the pulley 3 is ¼ inch above the bottom of the slide tube 1. A pin 4 is also provided. In the preferred embodiment the pin used is a ⅜ inch stub bolt, but other types of bolts or pins could be used. Two wire clamps 5 are also provided. Each wire clamp 5 includes two nuts 6, an anchor 7, and a "U" bolt 8. There is a groove 9 cut into the bottom of the bar 2. The groove 9 runs from a point slightly above the bottom of the rearward face of the bar 2 to a point on the bottom of the bar 2 slightly rearward of the bottom of the forward face of the bar 2. A stop nut 10 is attached to the bottom of the bar 2 at a point slightly rearward of the bottom of the forward face of the bar 2. In the preferred embodiment the stop nut 10 is a conventional ½ inch nut welded to the bar 2 with the hole through the nut running parallel with the longer of the two cross-sectional dimensions of the bar 2. A cable 11 is provided. The forward end of the cable 11 passed through the stop nut 10 and one of the cable clamps 5 is affixed to the forward end of the cable 11 and prevents the end of the cable 11 from pulling through the stop nut 10. The cable 11 passes through the pulley 3 and the rearward end of the cable 11 is wound around the pin 4 and attached to the pin 4 by the second cable clamp 5. The cable 11 fits within the groove 9. A stop 12 is also provided. In the preferred embodiment the stop is made from a piece of angle iron 6 inches long with 1 inch legs, but other materials in other sizes and shapes could be used.

Figure 2:
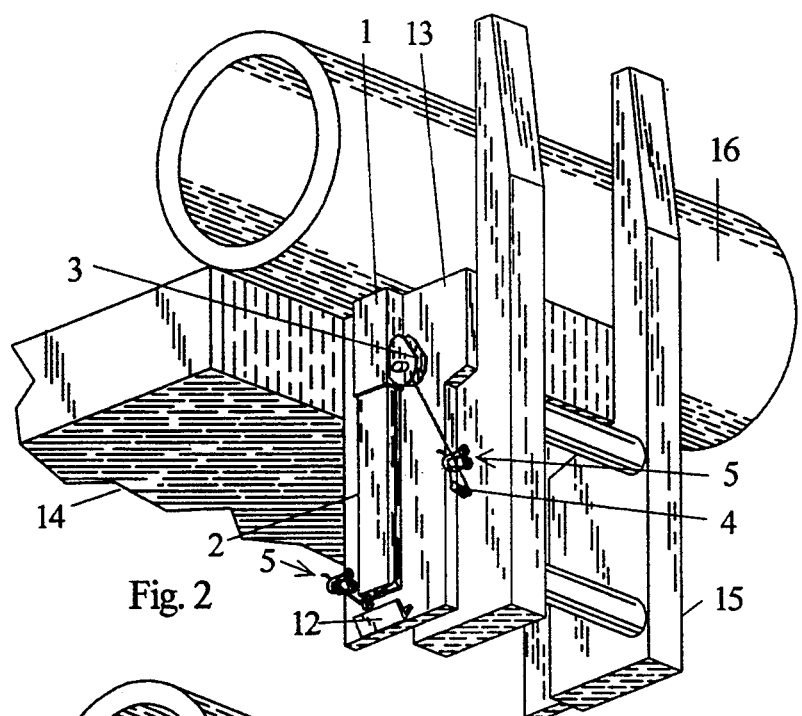
FIG. 2 is an orthographic view of the safety block shown in FIG. 1 shown in operation in the storage position.

Referring now to the orthographic view in FIG. 2 which shows the safety block in operation in the storage position, the rearward end of the cargo bed of a conventional pipe truck is shown. The figure shows a conventional pipe lift attached to the rearward end of a pipe truck. The lift mount 13 is attached to the rearward end of the cargo bed 14 such that the top of the lift mount 13 is flush with the top of the cargo bed 14. The lift fingers 15 are attached to the lift mount 13 and pivot around pivot pins located near the bottom of the rearward end of the lift mount 13. In storage position as shown in this figure the lift fingers 15 are vertical and extend above the top of the cargo bed 14. The lift fingers 15 each have an outside face and an inside face. In operation a pipe 16 is rolled rearward until it rests against the lift fingers. Said slide tube 1 is welded to the lift mount 13 such that the top of said slide tube 1 is flush with the top of the lift mount 13. In the preferred embodiment the forward face of said slide tube 1 is 2 inches from the forward face of the lift mount 13. Said pin 4 is welded to the outside face of the lift fingers 15 such that the longitudinal axis of said pin 4 is perpendicular to the outside face of the lift fingers 15. In the preferred embodiment the center of said pin is located 13 inches above the bottom of the lift fingers 15 and 1 inch rearward of the rearward face of the lift mount 13. Said stop 12 is welded to the lift mount 13. Said stop 12 is positioned with the legs upward and with the tops of the legs level. Said stop 12 is further centered on the lift mount 13 and the top of the welded leg is 2.5 inches above the bottom of the mount 13. In the storage position the top of said bar 2 is no less than 3.75 inches above the bottom of said slide tube 1.

Figure 3:
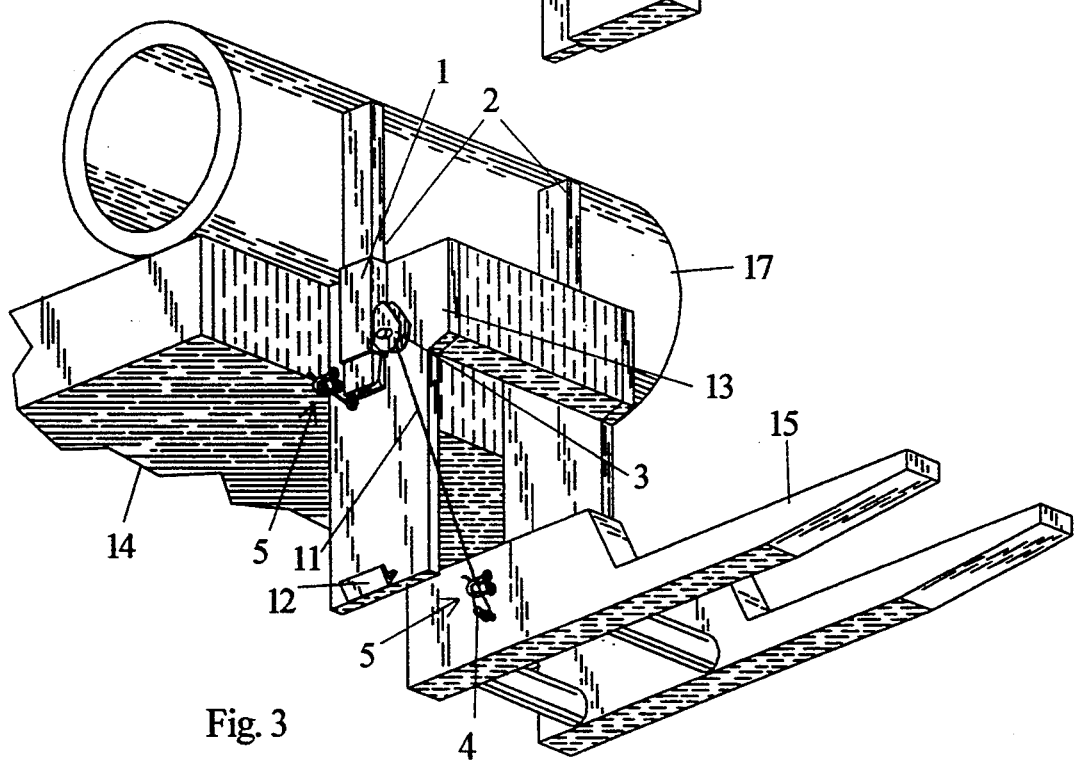
FIG. 3 is an orthographic view of the safety block shown in FIG. 1 shown in operation in the unloading position.

Referring now to the orthographic view in FIG. 3 which shows the safety block in operation in the unloading position, the rearward end of the cargo bed of a conventional pipe truck is shown. In this figure a piece of pipe has been unloaded from the truck and said lift fingers 15 remain in the unloading or down position. As said lift fingers 15 pivot downward and move in an are from the storage position shown in FIG. 2 to the unloading position shown in this figure said cable 11 is pulled downward and away from said slide tube 1. Because of said pulley 3, said cable 11 lifts said bar 2 automatically as the lift fingers 15 move downward. Said bar 2 slides upward through said slide tube 1 and forms a barrier which prevents other pieces of pipe 17 from rolling off the rearward end of said cargo bed 14 during the unloading process. Said stop 12 is positioned such that said bar 2 can not slide downward out of said slide tube 1 and drop from the truck. In the preferred embodiment safety blocks are employed in pairs with one safety block attached to each side of said lift mount 13.

The dimensions given above for placement of elements including said slide tube 1, said bar 2, said pin 4, and said stop 12, and the length of said cable 11 are set out for the preferred embodiment of the safety block. In the preferred embodiment said bar is 24 inches long. Each of these dimensions and positions are coordinated to provide the appropriate movement of said bar 2. Such dimensions and positions may be varied provided that they are coordinated to provide such appropriate movement of said bar 2.

In the preferred embodiment said cable 11 is attached to the bottom of said bar 2 by said stop nut 12 and said cable clamp 5 and said cable 11 is placed inside said groove 9, but other means of attaching said cable 11 to said bar 2 may be used provided such means of attachment is sufficiently strong and provided said bar 2 slides freely within said slide tube 1. In the preferred embodiment said cable 11 is attached to said lift finger 15 by said pin 4 and said cable clamp 5, but other means of attaching said cable 11 to said lift finger 15 may be used provided such means of attachment is sufficiently strong, provided said bar 2 slides freely within said slide tube 1, and provided said cable 11 does not interfere with the operation of said lift fingers 15 and said cable 11 does not rub against said lift fingers 15. In the preferred embodiment the cable 11 is made from ⅛ inch woven steel aircraft cable 40 inches long, but other types of cable could be used provided they are sufficiently strong, sufficiently supple, and wear sufficiently well for proper operation of the safety block.

While the preferred embodiment of the invention has been shown and described, it will be apparent to those skilled in this art that various modification may be made in this embodiment without departing from the spirit of the present invention. For that reason, the scope of the invention is set forth in the following claims:

I claim:

1. A safety block for attachment to a mount of a powered pipe lift on a rearward end of the cargo bed of a conventional pipe truck including:
   (1) a slide tube of given length, width, and height attached to the mount of the powered pipe lift, the slide tube being mounted vertically and with a top of the slide tube flush with a top of the mount, the slide tube having a forward face facing a forward end of said truck and a rearward face facing an opposite direction;

(2) a bar of given length, width, and height which slides freely up and down within said slide tube, the bar being longer than said slide tube and of sufficient length such that when a bottom of said bar is level with a bottom of said slide tube said bar protrudes above the top of said slide tube at a sufficient height to prevent pipe from rolling off of a rear of a cargo bed;

(3) a pulley attached to said slide tube near the bottom of said slide tube and on a rearward face of said slide tube;

(4) a cable one end of which is attached to the bottom of said bar, the cable passing through said pulley, an another end of said cable being attached to the pipe lift at a point below said pulley, said cable having a given length such that when pipe is unloaded from the truck using the pipe lift and when the end of said cable which is attached to the pipe lift moves as the pipe lift moves said cable being pulled through said pulley causes said bar to slide upward within said slide tube and create a barrier which prevents other pipe from rolling off an end of the pipe truck; whereby when the pipe lift is being employed to unload a piece of pipe the bar automatically slides upward within the slide tube and protrudes above a top of the cargo bed and forms a barrier which prevents other pieces of pipe from rolling off of the end of the cargo bed.

2. A safety block as set forth in claim 1 with a stop attached to the mount of the pipe lift below said bar which prevents the top of said bar from sliding downward beyond the bottom of said slide tube.

* * * * *